United States Patent Office 2,768,218
Patented Oct. 23, 1956

2,768,218

VINYL CYCLOOCTATETRAENE AND ITS PREPARATION

Louis E. Craig, Washington, N. J., and Clifford E. Larrabee, Easton, Pa., assignors to General Aniline & Film Corporation, New York, N. Y., a corporation of Delaware No Drawing. Application December 27, 1951, Serial No. 263,686

4 Claims. (Cl. 260—666)

This invention relates to vinyl cyclooctatetraene and its preparation by the cyclic polymerization of acetylene to produce a yellow-colored $C_{10}H_{10}$ fraction, extracting the fraction with an aqueous solution of a silver salt such as the nitrate, treating the extract with a silver precipitating agent such as hydrochloric acid, whereby a yellow oily phase is formed, separating the oily phase and distilling therefrom pure vinyl cyclooctatetraene.

The polymerization of acetylene to product a $C_{10}H_{10}$ fraction is known. In a typical method acetylene is reacted at 90 to 100° C. in a 5-liter autoclave containing 1800 cc. of tetrahydrofuran (perfectly dry), 100 grams of ethylene oxide and 30 grams of nickel cyanide (anhydrous), under 15 to 20 atoms pressure, 5 of which are nitrogen. The catalyst and cuprene are separated by filtration; solvent and cyclooctatetraene are distilled off leaving a blue-green fraction boiling between 42 and 60° C. at 2 mm. Traces of glycol and diglycol are removed by water-washing and drying. In order to remove the azulene, which is the cause of the blue-green color, the distillate is mixed with petroleum ether and shaken with 80% phosphoric acid. The petroleum ether is washed neutral, dried with sodium sulfate, the solvent distilled off, and the residue then fractionated. To remove minor quantities of oxygenated compounds, the hydrocarbon (B. P. 43 to 50° C. at 2 mm.) is dissolved in low-boiling petroleum ether, contacted with aluminum oxide, freed from solvent and the residue vacuum-distilled.

A yellow colored fraction is then obtained having a boiling point of about 47 to 50° C. at 2 mm. and an average formula $C_{10}H_{10}$. This fraction has been regarded as cyclodecapentaene.

It has been found in accordance with the invention that an aqueous solution of a silver salt selectively extracts the yellow component from this fraction, and that the yellow component may be liberated from the extract by treatment with a silver precipitating agent such as hydrochloric acid. Upon distillation of this yellow component, pure vinyl cyclooctatetraene is obtained.

The objects achieved in accordance with the invention as described herein include the provision of a process for the selective extraction of the yellow component from the $C_{10}H_{10}$ material obtained by the cyclic polymerization of acetylene, and recovering therefrom pure vinyl cyclootatetraene; and other objects which will become apparent as details or embodiments of the invention are set forth hereinafter.

In order to facilitate a clear understanding of the invention, the following preferred embodiments are described in detail:

*Example 1*

Twenty-five parts (by weight) of a $C_{10}H_{10}$ fraction [B. P. 70–75° C. (10 mm.), $n_D^{25}$ 1.569–1.578] obtained from the cyclic polymerization of acetylene was shaken vigorously for several minutes with a solution of 75 parts of silver nitrate in 100 parts of water. The yellow color went into the aqueous phase and an essentially colorless raffinate oily layer remained. After extracting this aqueous mixture with petroleum ether to remove insoluble oily material, the silver nitrate solution was treated with dilute hydrochloric acid until no more silver chloride separated. A yellow oil separated as the acid was added. The resulting mixture was extracted exhaustively with petroleum ether, the extracts dried over anhydrous sodium sulfate, and the petroleum ether removed by distillation. Distillation of the residue gave about 12 parts of yellow vinyl cyclooctatetraene, B. P. 82–4° C. (20 mm.). Careful refractionation through an efficient column gave very pure vinyl cyclooctatetraene, B. P. 83.3° C. (20 mm.), $n_D^{25}$ 1.5682, $d_4^{25}$ 0.9315. Elementary analyses gave the following results:

$C_{10}H_{10}$: Calculated—C, 92.26%; H, 7.74%. Found —C, 92.10%; H, 7.74%.

The structure of the product was established by hydrogenation. There was a hydrogen uptake corresponding to five double bonds and the product obtained thereby was ethylcyclooctane. The ultraviolet and infrared absorption spectra, as compared with those of cyclooctatetraene, are also consistent with the vinyl cyclooctatetraene structure.

*Example 2*

A solution of 50 parts of an Example 1 type $C_{10}H_{10}$ fraction dissolved in about 75 parts of low boiling petroleum ether was shaken with successive 50 part portions of 30% aqueous silver nitrate until no more yellow color was left in the organic layer. To the aqueous solution was then added 150 parts of sodium chloride and the resulting mixture subjected to steam distillation until no more yellow oily material distilled over. The combined distillates were extracted exhaustively with petroleum ether and the extracts treated in the manner described in Example 1 to give 23.3 parts of vinyl cyclooctatetraene, B. P. 82–84° C. (20 mm.).

The water-soluble silver nitrate complex can also be decomposed by sodium sulfate, sodium carbonate or sodium hydroxide. The vinyl cyclooctatetraene is conveniently recovered in these cases also by steam distillation. Recovery by extraction with petroleum ether is possible but difficult due to the presence of insoluble inorganic salts.

The complex may be decomposed by any halogen acid or soluble halide, or by any soluble salt which can supply an ion which forms an insoluble silver salt. The silver may be recovered as the nitrate by treatment of the insoluble salts, particularly the chloride, carbonate or oxide, with nitric acid and evaporation of the water.

It is indeed surprising that a water-soluble silver salt such as the nitrate selectively forms a water-soluble complex with vinyl cyclooctatetraene. Many other heavy metal salts tested failed to give such a complex. These are typified by barium nitrate, mercurous chloride, cuprous chloride, cupric nitrate, cadmium nitrate and zinc chloride. Mercuric sulfate formed a water-insoluble complex, but formed it with all of the $C_{10}H_{10}$ fraction, and therefore no separation was possible with this material.

In the polymerization of the acetylene, there may be included a small amount of an antioxidant such as an organic or inorganic compound having reducing properties, e. g. hydroquinone, diphenyl amine, dimethyl sulfite, sodium sulfite, sodium iodide, and the like. Although nickel cyanide is preferred as the catalyst in the polymerization, other nickel compounds may be used, such as the chloride, sulfate, hydroxide, carbonate, formate, or acetoacetic ester enolate. Generally the amount of the catalyst is 1 to 5% by weight of the solvent tetrahydrofuran, and the amount of the antioxidant is in the range of 0.05 to 1%. The temperature may be in the range of 60 to 140° C., preferably 90 to 100° C. for the production of $C_{10}H_{10}$; and the pressure may be in the range of 10 to 25 atmospheres or higher.

Vinyl cyclooctatetraene prepared in accordance with the invention is useful as an intermediate for the preparation of copoylmers, e. g. with maleic anhydride, which are useful as coating materials, and the like.

Variations and modifications of the invention will be apparent to one skilled in the art in view of the foregoing disclosures, and it is intended to include within the invention all such modifications and variations except as do not come within the scope of the appended claims.

We claim:

1. In the process of catalytically cyclopolymerizing acetylene and separating a yellow-colored $C_{10}H_{10}$ material, the improvement which comprises extracting the yellow component from said material with aqueous silver nitrate, in which the said yellow component is soluble treating the resulting extract with a material providing a silver precipitating anion whereby a yellow oily phase is formed, separating said yellow phase and distilling therefrom vinyl cyclooctatetraene.

2. The method of claim 1 wherein the temperature during the cyclopolymerizing step specified is in the range of 90 to 100° C. and the $C_{10}H_{10}$ material is dissolved in low boiling petroleum ether.

3. The method of claim 2 wherein the material providing the anion is hydrochloric acid.

4. The method of claim 2 wherein the material providing the anion is sodium chloride.

References Cited in the file of this patent

Copenhaver et al.: "Acetylene and Carbon Monoxide Chemistry" (1949), pp. 216–218, Reinhold, publisher, New York.

Cope et al.: "Jour. Am. Chem. Soc.," vol. 72 (1950), pp. 630–631.

Cope et al.: "Jour. Am. Chem. Soc.," vol. 72 (1950), pp. 2515–2520.

Craig et al.: "Jour. Am. Chem. Soc.," vol. 73 (1951), pp. 1191–1195.

Cope et al.: "Jour. Am. Chem. Soc.," vol. 73 (1951), pp. 1195–1198.

Craig: Chemical Reviews, vol. 49 (1951), pp. 112, 134.